(12) United States Patent
Liñan et al.

(10) Patent No.: US 8,460,736 B2
(45) Date of Patent: Jun. 11, 2013

(54) LIQUID AND STABLE OLEIN FRACTIONS

(75) Inventors: Joaquin Jesus Salas Liñan, Sevilla (ES); Enrique Martinez-Force, Sevilla (ES); Rafael Garcés Mancheño, Sevilla (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 813 days.

(21) Appl. No.: 12/373,023

(22) PCT Filed: Jul. 13, 2007

(86) PCT No.: PCT/EP2007/006221
§ 371 (c)(1),
(2), (4) Date: Jul. 15, 2009

(87) PCT Pub. No.: WO2008/006597
PCT Pub. Date: Jan. 17, 2008

(65) Prior Publication Data
US 2010/0009056 A1    Jan. 14, 2010

(30) Foreign Application Priority Data
Jul. 14, 2006  (EP) .................................. 06380201
Oct. 16, 2006  (ES) .................................. 200602620

(51) Int. Cl.
*C11B 15/00*   (2006.01)
*A23D 9/00*    (2006.01)

(52) U.S. Cl.
USPC ........................................ 426/601; 426/430

(58) Field of Classification Search
USPC ................... 426/601, 607, 425, 429, 430
See application file for complete search history.

(56) References Cited

U.S. PATENT DOCUMENTS

| | | | | |
|---|---|---|---|---|
| 3,345,389 A | * | 10/1967 | Zilch | 530/206 |
| 4,129,583 A | * | 12/1978 | Zondek | 554/184 |
| 6,348,610 B1 | * | 2/2002 | Martinez Force et al. | 554/224 |
| 6,414,172 B1 | * | 7/2002 | Garces et al. | 554/227 |
| 6,486,336 B1 | * | 11/2002 | Osorio et al. | 554/224 |
| 6,713,117 B1 | * | 3/2004 | Kodali | 426/601 |
| 6,953,882 B2 | * | 10/2005 | Martinez Force et al. | 800/322 |
| 7,592,015 B2 | * | 9/2009 | Martinez-Force et al. | 424/401 |

FOREIGN PATENT DOCUMENTS

| WO | 01/96507 A1 | 12/2001 |
|---|---|---|
| WO | 2005/046315 A1 | 5/2005 |

OTHER PUBLICATIONS

Guinda, A. 2003. Eur. J. Lipid Sci. Technol 105:130.*
Fernandez-Moya, V., et al., Oils From Improved High Stearic Acid Sunflower Seeds, Journal of Agricultural and Food Chemistry 53:5326-5330, 2005.
Fernandez-Moya, V., et al., Lipid Characterization of a High-Stearic Sunflower Mutant Displaying a Seed Stearic Acid Gradient, Journal of Agricultural and Food Chemistry 54:3612-3616, 2006.

* cited by examiner

*Primary Examiner* — Carolyn Paden
(74) *Attorney, Agent, or Firm* — Christensen O'Connor Johnson Kindness PLLC

(57) ABSTRACT

The present invention relates to a stable and liquid olein fraction wherein less than 8.6% of the TAG species of said olein fraction have the general formula SMS and at least 26% of TAG species of said olein fraction have the general formula SMM, wherein S represents a saturated fatty acid and M represents a monoenoic fatty acid, which olein fraction is obtainable by fractionation of a high oleic high saturated sunflower oil; and collecting the liquid fraction. The invention further relates to a method for preparation of a stable and liquid olein fraction by low temperature fractionation of a high oleic, high saturated sunflower oil.

34 Claims, 1 Drawing Sheet

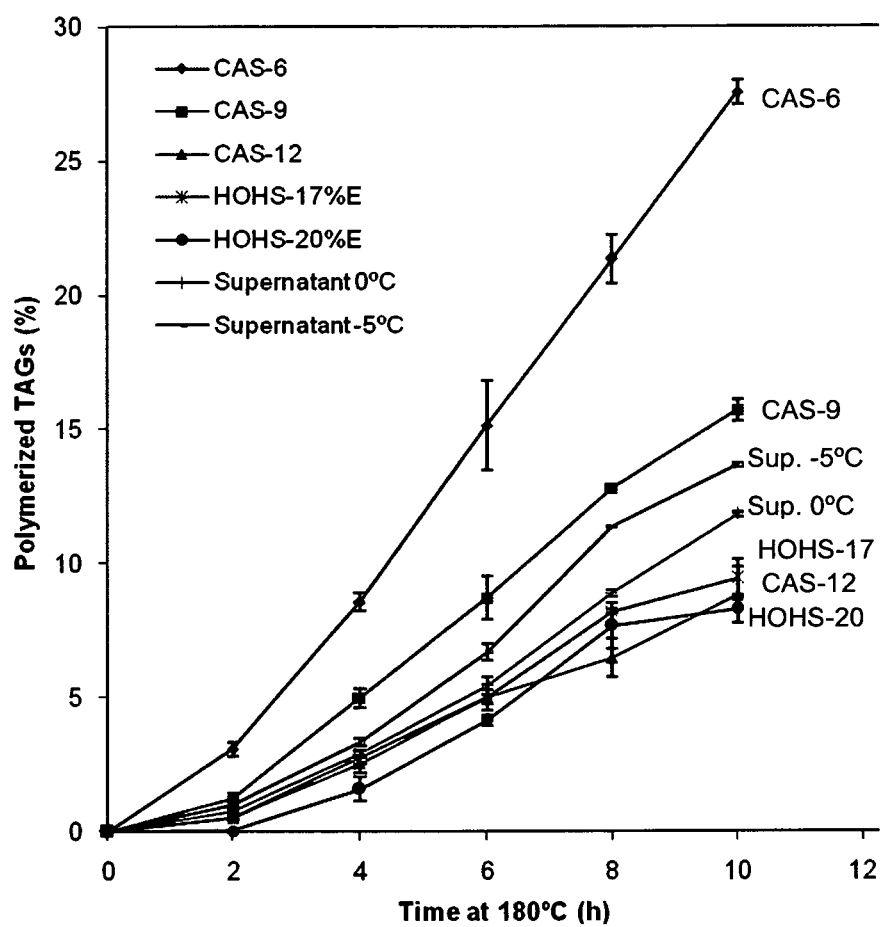

LIQUID AND STABLE OLEIN FRACTIONS

FIELD OF THE INVENTION

The present invention relates to olein fractions, which are particularly suitable for applications in which the oil needs to be liquid and resistant to oxidation. The invention further relates to the use of the olein fraction and to oil mixtures comprising these fractions.

BACKGROUND OF THE INVENTION

Naturally occurring oils are made of triacylglycerols (TAGs) that account for more than 98% of the total oil. Therefore, the chemical and physical properties of the oils are determined by their triacylglyceride composition and the fatty acid distribution on these molecules.

Vegetable fats and oils used for food and other, non-food applications, where high oxidation stability is needed, require a special triacylglyceride composition, mainly if chemical treatments such as hydrogenation are to be avoided. Partially hydrogenated oils contain trans isomers of fatty acids that are considered undesirable from a nutritional point of view.

Some commodity oils meet part of these requirements but have technological or nutritional disadvantages. For example, palm oil and palm olein have high stability but they are solid or semi-solid at room temperature due to the disaturated and trisaturated TAG content, and nutritionally unhealthy mainly due to the palmitic acid content in the sn-2 TAG position (Renaud et al., J. Nutr. 125:229-237 (1995)). High oleic vegetable oils are liquid to temperatures below 0° C. but are not sufficiently stable. Therefore, uses where stable and liquid oil is required could not be fulfilled with these oils.

Healthy oils with good oxidative stability should have a low content of saturated fatty acids, comprising preferably stearate because it is neutral in respect to the serum cholesterol levels (Pearson, Am. J. Clin. Nutr., 60(S):1071S-1072S, (1994); Kelly et al., Eur. J. of Clinical Nutr., 55:88-96, (2001)), and should not have saturated fatty acids in the middle position (sn-2) of the triacylglyceride. Oils with saturated fatty acids in the middle position of the triacylglyceride have been suggested to be responsible for the atherogenic effects of these oils (Renaud et al., J. Nutr. 125:229-237 (1995)).

WO0019832 teaches how a high-stearate and high-oleate oil from *Brassica* could be obtained. In addition, some fractions of stearin and olein were obtained.

WO99057990 teaches furthermore how a high-stearate and high-oleate oil from soybean could be obtained and how, in addition, some stearin and olein fractions were obtained. All the oils and fractions shown in these patent publications have more than 0.5% of linolenate Therefore, none of these previous oils or their fractions are a good material to obtain the olein fraction of the present invention.

Some tropical olein fractions blended with standard commodity oils have been proposed to be used as frying fats. As taught in WO2006/061100, an olein fraction from tropical shea butter could be blended with commodity oils resulting in a frying fat. However, shea butter has the disadvantage that it is rather rare, obtained from a tropical trees. For oil manufacture on an industrial scale sourcing may become a problem.

EP-1290119 describes the use of a high stearic high oleic sunflower oil (HSHOSF) for the production of stearin, which is blended with a liquid vegetable oil to prepare a fat phase. The solids content of the stearin fraction is more than 50 wt. % and it contains at least 30 wt. % SUS fatty acids. The stearin fraction is entended for structuring the vegetable oil to obtain a margarin or spread. The stearin fraction thus provides the solids in these products and is not itself a liquid.

Oils made mainly of saturated and monounsaturated fatty acids have very good stability, but, taking into account the TAG biosynthesis in plants, oils with increased saturated fatty acids content will have noticeable amounts of TAGs with two or three saturated fatty acids. These TAGs will precipitate, even at room temperature, making this oils solidify very easily. Oils liquid as low as 0° C. and stable are of industrial interest. Sunflower oils with high-stearate in high-oleate background have very good oxidative stability but are easily solid. Fractions of this oil without most of the disaturated TAGs should have good stability and will be liquid at a temperature of around 0° C.

It is therefore the object of the present invention to provide a new oil that is both liquid at low temperatures and resistant to oxidation.

SUMMARY OF THE INVENTION

The invention thus relates to an olein fraction, wherein:
 a. less than 8.6% of the TAG species of said olein fraction have the general formula SMS and
 b. at least 26% of TAG species of said olein fraction have the general formula SMM wherein S represents a saturated fatty acid and M represents a monoenoic fatty acid, which fraction is obtainable by fractionation oil of high-oleate and high-saturated (HOHS) sunflower oil and collecting the liquid fraction, called olein. The liquid fraction is the supernatant of the fractionation. The HOHS oil is preferably a high oleic high stearic (HOHE) sunflower oil.

The olein fraction of the present invention has superior oxidative stability, is liquid at a temperature near to or below 0° C. and has a triacylglyceride composition that makes it healthy compared to other high saturated stable oils like palm oil or palm olein.

The fractionation methods that are suitably used are dry or solvent fractionations.

The invention also provides the different uses of the oil. The improved characteristics of the olein fraction permit it to be used in several food and non-food products in situations where liquid oils with increased oxidative stability, fry stability and shelf-life stability are desirable, being at the same time a healthy product.

The oxidative stability of oils is defined by the fatty acid composition of TAGs. TAGs rich in polyunsaturated fatty acids are more unstable than TAGs rich in saturated and monounsaturated fatty acids. Unsaturated fatty acids found in commodity oils are oleate, linoleate and linolenate having one, two and three double bonds, respectively. Linolenate is the most unstable fatty acid and responsible for the fishy flavours and therefore should be as low as possible in stable oils, preferably as traces (below 0.5%). Oils with linolenate above this value are not good starting material to fractionate the olein of this invention.

The olein fraction of the invention has less than 0.5% by weight of linoleate.

The olein fraction is liquid at room temperature and more stable than other oils that are liquid at room temperature, such as the standard oil CAS-6 (Salas et al. JAOCS, 83:539-545 (2006)) and the high oleic oil CAS-9 (Fernandez-Moya et al. J. Agric. Food Chem. 53:5326-5330 (2005)). The high oleic and high stearic oil HOHS (WO0074470) is very stable but not liquid at room temperature. The high oleic and high palmitic oil IG-1297M (WO9964546) is equally stable but not liquid at room temperature and it comprises higher contents of palmitic which is less desirable from a nutritional point of view.

BRIEF DESCRIPTION OF THE DRAWINGS

FIG. 1 shows the courses of polymerization of different oils at 180° C.

DETAILED DESCRIPTION OF THE INVENTION

The oil fraction of the invention has a cloud point lower than 5° C., preferably lower than 0° C., more preferably lower than −6° C.

The stable and liquid oil fraction of the invention is obtainable by low temperature fractionation of a high oleic, high saturated sunflower oil.

In a first embodiment, the low temperature fractionation is a dry fractionation, which includes the following steps:
  decreasing the temperature of the oil to 12° C., more preferably 9.5° C., even more preferably 5° C., optionally with stirring;
  separating the olein from the solid fraction; and
  optionally fractionating the resulting olein again at 2.5° C., more preferable 0° C. to obtain a less saturated olein fraction.

In another embodiment the low temperature fractionation is a solvent fractionation, which includes the following steps:
  mixing the oil with an organic solvent like acetone, hexane or ethyl ether;
  decreasing the temperature of the oil solution to 0° C., preferably −5° C.;
  separating the olein from the solid fraction; and
  optionally recovering the olein by removing the solvent from the supernatant.

In a particular embodiment, the solvent is removed from the supernatant by distillation at vacuum.

The invention is based on the use of a particular oil as the source oil for the fractionation. The source oil should have a particular TAG composition. The olein fraction of the invention comprises between 1.8 and 9.8% SUS, preferably between 2.4 and 8.8%, more preferably between 3.8 and 7.9%, most preferably between 4.2 and 7.6% and between 54 and 64% SUU, preferably between 56 and 62%, more preferably between 58 and 60%.

High-saturated and high-oleate sunflower oils for use as a starting material for preparing the oil fraction of the invention can be extracted from seeds HOHS described in WO0074470 (the parents of which are CAS-3 (ATCC75968) and a high thioesterase mutant (ATCC PTA-628)). These seeds are also described in Fernandez-Moya et al. (J. Agric. Food Chem. 53: 5326-5330 (2005)) as CAS-15. Other oils are the HOHP described in WO9964546. IG-1297M seeds deposited as ATCC n° 209591, that have the same TAG composition than CAS-12 from Alvarez-Ortega et al. (Lipids 32: 833-837 (1997)) or oils and seeds described in WO0074469, these last are also described in Serrano-Vega et al. (Lipids 40: 369-374 (2005)) as CAS-25.

Tables 1 and 2 show the triacylglyceride molecular species and triacylglyceride class composition of high-oleate and high-stearate oil of CAS-15 in comparison with a high-oleate oil (CAS-9).

TABLE 1

Triacylglyceride composition of the high-oleate and high-stearate sunflower oil (CAS-15) compared with a control high-oleate sunflower oil (CAS-9).

| Triacylglyceride | Triacylglyceride content (mol %) | |
| --- | --- | --- |
| | CAS-9 | CAS-15 |
| POP | — | 0.5 |
| POE | 0.4 | 4.5 |
| POO | 6.4 | 6.2 |
| PLE | — | 0.6 |
| POL | — | 1.4 |
| PLL | — | — |
| EOE | 0.5 | 10.4 |
| EOO | 11.7 | 37.7 |
| ELE | — | — |
| OOO | 70.9 | 14.3 |
| EOL | — | 7.7 |
| OOL | 6.6 | 4.0 |
| ELL | — | 1.2 |
| OLL | — | 0.8 |
| EOA | — | 1.5 |
| OOA | 0.9 | 2.8 |
| OLA | — | 0.5 |
| EOB | — | 1.4 |
| OOB | 2.5 | 3.7 |
| OLB | — | 0.7 |

P = palmitic acid = 16:0;
E = stearic acid = 18:0;
O = oleic acid = 18:1;
L = linoleic acid = 18:2;
A = araquidic acid = 20:0;
B = behenic acid = 22:0

TABLE 2

Triacylglyceride class composition of the high-oleate and high-stearate sunflower oil (CAS-15) compared with a control high-oleate sunflower oil (CAS-9).

| | CAS-9 | CAS-15 |
| --- | --- | --- |
| SMS | 0.9 | 18.3 |
| SDS | — | 0.6 |
| SMM | 21.5 | 50.4 |
| SDM | — | 10.3 |
| SDD | — | 1.2 |
| MMM | 70.9 | 14.3 |
| MDM | 6.6 | 4.0 |
| MDD | — | 0.8 |
| SUS | 0.9 | 18.9 |
| SUU | 21.5 | 61.9 |
| UUU | 77.5 | 19.1 |

S = saturated fatty acid,
M = monoenoic fatty acid and
D = dienoic fatty acid,
U = Unsaturated fatty acid.

In a first embodiment, the oil is a high oleic high stearic (HOHE) sunflower oil obtainable by extracting seeds of the sunflower strain CAS-15 (Fernandez-Moya et al. J. Agric. Food Chem. 2005, 53, 5326-5330), that is a HOHS type line as described in WO0074470, or from another HOHE strain obtainable by crossing CAS-3 (ATCC-75968) with a high oleic high thioesterase mutant (ATCC PTA-628).

In a second specific embodiment, the high oleic high saturated sunflower oil is a high oleic high palmitic (HOHP) sunflower oil obtainable by extracting seeds of the sunflower strain IG-1297M (corresponding with CAS-12), which seeds were deposited on 20 Jan. 1998 under the ATCC accession number ATCC-209591.

In a further embodiment the high oleic high stearic sunflower oil is obtainable by extracting seeds of CAS-25, producing a high oleic high palmitic oil with low palmitoleic and low asclepic and obtainable by crossing IG-1297M (ATCC-209591) with CAS-3 (ATCC-75968).

The olein fraction of the invention can be obtained from the oil extracted from these seeds. The invention is however not limited to the olein fractionated from the oil extracted from these seeds. Any HOHS oil is a suitable starting oil for producing the oil of the invention. Such HOHS oil may be used pure, i.e. directly extracted from the seeds, or blended to have high contents of oleic acid and saturated fatty acids. Such oils are named herein "HOHS". CAS-15, CAS-33 and other HOHS oils all have similar oleic and saturated contents but may differ in other characteristics.

Solvent or dry fractionation of any high-oleic high saturated, in particular high-stearic, oils can provide an olein fraction according to the invention.

Solvent fractionation is made with equal amounts of acetone, hexane or ethyl ether and cooling the mixture to 0° C. After centrifugation at 10000×g in a Sorvall preparative centrifuge at 0° C. a precipitate, the stearine fraction, and a supernatant, the olein fraction, could be separated. The liquid olein fraction has very low content of disaturated TAGs and an increased content of unsaturated TAGs, Table 3 and 4 show the composition of an example of the original oil from a HOHS seed line and the olein fraction. The olein fraction has a reduced amount of the disaturated TAGs POP, POS, SOS, SOA and SOB.

TABLE 3

Triacylglyceride composition of a olein fraction from high-oleate high-saturated sunflower oil compared with the original oil (HOHS).

| Triacylglyceride | Triacylglyceride content (%) | |
| --- | --- | --- |
|  | HOHS | Olein |
| POP | 0.3 | 0.2 |
| POE | 2.3 | 1.1 |
| POO | 6.7 | 7.3 |
| POL | 0.7 | 0.7 |
| EOE | 4.2 | 0.9 |
| EOO | 34.4 | 36.7 |
| OOO | 31.7 | 35.0 |
| EOL | 2.7 | 2.7 |
| OOL | 4.2 | 4.7 |
| OLL | 0.4 | 0.4 |
| EOA | 0.9 | 0.4 |
| OOA | 3.4 | 3.6 |
| OLA | 0.3 | 0.0 |
| EOB | 1.1 | 0.0 |
| OOB | 6.6 | 6.2 |

P = palmitic acid = 16:0;
E = stearic acid = 18:0;
O = oleic acid = 18:1;
L = linoleic acid = 18:2;
A = araquidic acid = 20:0;
B = behenic acid = 22:0

TABLE 4

Triacylglyceride class composition of a olein fraction from high-oleate high-saturated sunflower oil compared with the original oil (HOHS of . . . ).

| Triacylglyceride | Triacylglyceride content (%) | |
| --- | --- | --- |
| Class | HOHS | Olein |
| SMS | 8.9 | 2.7 |
| SDS | — | — |
| SMM | 51.1 | 53.8 |

TABLE 4-continued

Triacylglyceride class composition of a olein fraction from high-oleate high-saturated sunflower oil compared with the original oil (HOHS of . . . ).

| Triacylglyceride | Triacylglyceride content (%) | |
| --- | --- | --- |
| Class | HOHS | Olein |
| SDM | 3.7 | 3.4 |
| SDD | — | — |
| MMM | 31.7 | 35.0 |
| MDM | 4.2 | 4.7 |
| MDD | 0.4 | 0.4 |
| DDD | — | — |

S = saturated fatty acid,
M = monoenoic fatty acid and
D = dienoic fatty acid.

It was surprisingly found that oils of this type have excellent stability properties, in accelerated stability oxidation experiments, and are liquid at temperatures near 0° C. and below.

The stability of the oil of the invention can be expressed as the amount of altered TAGs (oxidized triacylglyceride monomers and polymerized triacylglyceride) after an accelerated oxidation test. For the present invention, the test has been carried out by introducing 2 g of the oils into an oven at 180° C. and sampling 50 mg at 2 h intervals to determine altered TAGs. Remaining oils after 10 h treatment were taken out and additionally analyzed for polar compounds and distribution in oxidized TAG monomers and TAG polymers.

From this it follows that oil of the invention is liquid at low temperatures around 0° C. and significantly stable. The triacylglyceride composition of oils of the invention is significantly different from the prior art oils as will be demonstrated in the Examples.

The oil of the invention is a natural oil that can be extracted from sunflower seeds and obtained by low temperature dry or solvent fractionation. This olein fraction is thermostable without modification methods as hydrogenation of fatty acid double bonds, transesterification of any other chemical modification. The oil of the invention is obtained without performing such artificial modification processes.

A preferred sunflower oil olein fraction of the invention comprises between 1.6% and 8.6% SMS, more preferably between 2.1% and 8.4% and most preferably between 3.4% and 8% and between 26% and 62% SMM, preferably 38% and 60%, more preferably 40% and 58%, most preferably 42% and 56%. In addition, it is preferred that the oil fractions of the invention have less than 8% saturated fatty acids at position sn-2 of the TAGs that constitute the oil, preferably less than 5%, more preferably less than 3%.

The saturated fatty acids are usually stearic acid and palmitic acid. It is preferred that the oil fraction of the invention has relatively high-stearate content, because the oil will then be healthier. To ensure the maximal thermostability it is preferred that the total SMM of the olein fraction should be at least 30%, more preferably at least 35%, most preferably 45% or more.

It is preferred that the oil in addition has a high oleic acid content and a correspondingly low linoleic acid, because oleic acid is more stable than linoleic acid and has very good nutritional properties. It is preferred that the oil has in addition less than 15% linoleic acid, more preferably less than 10%, most preferably 5% or lower based on the total weight of the fatty acids.

It is also preferable than the linolenate content should be below 0.5%, because linolenate is the most unstable fatty acid of commodity oils and it is responsible of the fishy flavours.

In a first preferred embodiment, the invention relates to an olein fraction in which 1.6% to 8.6%, in particular 3.4% of the TAG species have the general formula SMS, 26% to 62%, in particular 48% of the TAG species have the general formula SMM, and the olein fraction having
- a cloud point of 4° C. to −6° C., in particular −1.2° C. and
- a thermal stability such that after heating to 180° C. during 10 hrs a maximum of 20.1% to 26.5%, in particular 22.3% if the TAGs are altered.

Such oil is obtainable by wet fractionation of oil from seeds of CAS-15.

In a second preferred embodiment, the invention relates to an olein fraction in which 2.6% to 7.4%, in particular 4.2% of the TAG species have the general formula SMS, 39% to 59%, in particular 49% of the TAG species have the general formula SMM, and the olein fraction having
- a cloud point of 3° C. to −4° C., in particular −0.2° C. and
- a thermal stability such that after heating to 180° C. during 10 hrs a maximum of 19.8% to 24.2%, in particular 20.2% if the TAGs are altered.

Such oil is obtainable by dry fractionation of oil from seeds of CAS-15.

The olein fraction of the invention is thermostable in the sense that it resists oxidation and polymerization of the TAGs that constitute the oil better than high-oleate oils do. As a consequence thereof, the olein fraction of the invention is particularly suitable for long life storage and for frying and cooking at temperatures of at least 100° C., preferably 160° C. or 180° C. Frying is intended to encompass frying and stir-frying of food stuffs, such as meat, fowl, fish, fruits, vegetables etc. as well as deep-frying of pastry, fries, snacks. Furthermore, the oil of the invention is also suitable for baking, roasting, cooking, and the production of mayonnaise, light mayonnaise, reduced fat mayonnaise, mustard, ketchup, tartar sauce, sandwich spread, salad bar bottle, salad dressing, pre-cooked food, prepared soup, sauces, cream, etc.

In a more general sense the invention relates to the use of an olein fraction, having less than 15% saturated fatty acids and less than 10%, preferably less than 5% linoleic acid after having subjected the oil to high temperature conditions, which consist of keeping the oil in an oven at 180° C. for 10 h. In practice, such high temperature conditions are for example encountered in frying and baking.

The invention is not limited to the oil as such. The invention
- relates to the use of the oil in mixtures with other oils, in these mixtures the overall properties may differ from the oil of the invention and also to be used in industrial process like enzymatic or chemical interesterification for further fractionation of the oil.

The olein fraction of the invention can be used with some antioxidants or other additives to improve its properties, mainly in discontinuous frying operations, as taught in Márquez-Ruiz et al. (Eur. J. Lipid Sci. Technol. 106:752-758 (2004)). In this paper it is shown that some silicones and particularly dimethylpolysiloxane (DMPS) added to oils and fats at very low concentrations improve their properties mainly in discontinuous frying operations. This additive has been widely used in commodity frying oils as inhibitor of thermo-oxidative reactions in deep frying. The invention further relates to a method for preparation of a stable and liquid oil fraction by low temperature fractionation of a high oleic, high saturated sunflower oil. The method is a low temperature fractionation and is preferably either a dry fractionation or a solvent fractionation.

As used herein, the terms "oil fraction", "olein fraction" and "oil of the invention" are used interchangeably. Although the product of the invention is a fraction from an oil it is itself still an oil and thus also referred to as "oil".

The TAG species of the general formula SUS, wherein S is a saturated fatty acid and U is an unsaturated fatty acid, are SMS and SDS. M is monoenoic fatty acid with one unsaturated bond. D is dienoic fatty acid with two unsaturated bond. The SMS species are EOE, POP, POE, EOB, EOA. The SDS species are PLP, ELE, PLE.

The TAG species of the general formula SUU are SMM, SMD, and SDD. The SMM species are POO, EOO, OOA and OOB. The SMD species are POL, EOL, OLA and OLB. The SDD species are PLL and ELL The TAG species of the general formula UUU are MMM, MMD, MDD and DDD, The MMM species is OOO. The MMD species is OOL. The MDD species is OLL and the DDD species is LLL.

The present invention will be further illustrated in the Examples that follow and that are in no way intended to limit the invention. In the Examples reference is made to the following FIGURE:

FIGURE. Courses of polymerization of different oils at 180° C. Common sunflower (CAS-6), high-oleic sunflower (CAS-9), high-oleic high-palmitic sunflower (CAS-12), high-oleic high-stearic oils (HOHS-17% E and HOHS-20% E) and supernatants of fractionation of high oleate high stearate oils at 0° C. (supernatant 1) and −5° C. (supernatant 2) were studied.

EXAMPLES

Example 1

Preparation of Oils for Preparing the Olein Fraction of the Invention

1. Plant Material

The olein fraction of the invention can be prepared from seeds of the deposited strain IG-1297M or from seeds that are obtained in any other way. One other way of obtaining such seed is illustrated hereinbelow.

Mature high-oleate and high-stearic sunflower seeds from HOHS as described in WO0074470 and/or CAS-15 seeds as described in Fernandez-Moya et al. (J. Agric. Food Chem. 53:5326-5330 (2005)), all with high-stearate content in high-oleate background were used.

High-oleic high-stearic oils (HOHS) are all similar and independent of the seeds used to extract the oils that were used in these examples, oils could be extracted from any other seed and used pure or blended to obtain a specific TAG composition.

CAS-12 (deposited as IG-1297M (ATCC 209591)) or CAS-25 (obtained from a cross between IG-1297M and CAS-3 as described in Serrano-Vega et al. Lipids 2005, 40, 369-374) with or without palmitoleate were used. High-oleic high-palmitic oils are all similar and independent of the seeds used to extract the oils that were used in these examples, oils could be extracted from any other seed and used pure or blended to obtain a specific TAG composition.

As control materials mature seeds from a normal sunflower line (standard, CAS-6) and a high oleic line (CAS-9) were used.

Some examples of the fatty acid composition of the oils used in these examples could be found in the table 5.

TABLE 5

Fatty acid composition of some oils used in this patent.

| Sunflower oil | Fatty acid composition (mol %) | | | | | |
|---|---|---|---|---|---|---|
| | 16:0 | 18:0 | 18:1 | 18:2 | 20:0 | 22:0 |
| Standard (CAS-6) | 4.96 | 7.8 | 28.39 | 57.24 | 0.43 | 1.17 |
| High-oleic (CAS-9) | 3.71 | 7.28 | 85.48 | 1.18 | 0.7 | 1.64 |
| HOHS 17% E | 4.45 | 17.75 | 70.37 | 3.34 | 1.52 | 2.56 |
| HOHS 20% E | 4.55 | 20.2 | 67.49 | 2.87 | 1.74 | 3.16 |
| HOHS 24E | 5.12 | 24.0 | 61.63 | 4.14 | 2.18 | 2.93 |
| HOHS 253 | 5.71 | 19.6 | 57.91 | 12.83 | 1.46 | 2.36 |

Oils HOHS 17%, HOHS 24E and HOHS 253 were extracted from CAS-33 and CAS-15 seed and used pure. HOHS 20% is a blended oil.

2. Extraction of the Oil

At a laboratory scale, the oils used for the preparation of the olein fraction of this invention were extracted from seeds using a process comprising the crushing of the seeds to a fine powder that was mixed with ⅕ w/w of anhydrous sodium sulphate. Then, the resulting cake was packed in filter paper cartridges containing 25 g approx. of the mixture and extracted in Sohxlett for 16 h using heptane as the solvent. The oil enriched mixture recovered in the solvent reservoir was distilled at vacuum at 80° C. and the traces of solvent stripped by applying a flow of nitrogen.

An alternative method involved the crushing of the seeds to a fine powder and the discontinuous extraction of the oil by mixing the ground seeds with 2 vols by weight of heptane. The suspension was transferred to screwed-capped flasks and kept at 80° C. for 2 h. Then one vol. of 10 g/L NaCl in methanol was added and phases let to separate. The heptane-enriched supernatant was withdrawn and distilled at vacuum at 80° C. The oil was finally stripped with a flow of nitrogen to remove traces of solvent. For larger scale extraction, seed oil was extracted using a continuous oil press with a capacity of 8 kg/h. Batches of 5 kg were extracted and then refined. Since these oils displayed low content of phosphate they were not degummed. Removal of the excess of free fatty acids was carried out by neutralization with 12° Baumé (2.18 M) lye at 15° C. for 40 min. Soapstocks were removed by centrifugation and the oil was then water washed. The next step was oil bleaching by treatment with activated bleaching clay (1% w/w) at 70° C. for 10 min. Finally, the oil was deodorized by applying 3% steam at 200° C. for 3 h under vacuum for 3 h.

Example 2

Characterization of TAGs

1. TAG Distribution in the Oils

Purified TAG from the sunflower oils used for preparing the olein fraction of the invention were obtained by passing 3 g oil dissolved in 3 ml petroleum ether over alumina, which had been activated at 200° C. for 3 h immediately before use. The alumina (1.5 g.times.2) was placed into two small columns connected by a piece of silicone tube and the lipid solution placed on the top and allowed to filter through the alumina. The columns were washed further with 6 ml petroleum ether. The solvent was evaporated and the purified TAG flushed with nitrogen and stored at −20° C.

The TAG were devoid of tocopherols as determined by HPLC following the IUPAC Standard Method 2432 (IUPAC Standard Methods for the Analysis of Oils, Fats and Derivatives, Blackwell, Oxford, 7.sup.th ed. (1987)).

The composition of TAG molecular species was carried out by gas chromatography of the purified TAG using a DB-17-HT (Agilent Technologies, USA) capillary column 15 m.times.0.25 mm I.D., 0.1 .microm film thickness, hydrogen as the carrier gas and FID detector, According to J Agr Food Chem. 2000, 48, 764-769.

Example 3

Preparation of Olein Fractions of the Invention

1.—Fractionation of Oils using Solvents

Oils extracted from seeds mentioned in example 1 were dissolved in 3 volumes of an organic solvent, such as hexane, acetone or ethyl ether. Other oil to solvent ratios yield the same results, see "Edible Fats and Oils Processing: Basic Principles and Modern Practices", 1990, World Conference Proceedings, American Oil Chemists' Society. Then they were kept at low temperature for periods of 24 h. Supernatants were separated from precipitates by centrifugation at 5000×g and solvent removed from the olein fraction by flushing with nitrogen. Olein fractions were stored at −20° C. under atmosphere of nitrogen. Two fractionations were performed at 0° C. and −5° C., yielding oleins of different composition and properties.

TABLE 6

Triacylglycerol composition of high stearic-high oleic oils and different fractions prepared by fractionation with acetone at 0° C. (sup. 1) and −5° C. (sup. 2).

| Triacyl-glyceride | Triacylglyceride composition (mol %) | | | | | |
|---|---|---|---|---|---|---|
| | HOHS 253 | HOHS 24E | Sup. 1_253 | Sup. 1_24E | Sup 2_253 | Sup. 2_24E |
| POP | 0.82 | 0.83 | 0.62 | 0.57 | 0.69 | 0.72 |
| PLP | 0.23 | | 0.2 | | 0.22 | |
| POE | 4.03 | 5.72 | 1.95 | 1.54 | 1.67 | 1.3 |
| POO | 8.54 | 8.13 | 9.53 | 13.75 | 11.63 | 15.77 |
| PLE | 1.52 | 0.23 | 1.41 | 0.37 | 1.14 | 0.38 |
| POL | 1.83 | 1.06 | 2.13 | 1.86 | 2.31 | 2.24 |
| PLL | 1.18 | | 1.16 | 0.21 | 1.18 | |
| EOE | 5.28 | 10.07 | 1.12 | 1.04 | 0.68 | 0.59 |
| EOO | 27.67 | 39.24 | 30.3 | 32.74 | 27.38 | 30.22 |
| ELE | 2.01 | 0.6 | 1.1 | | | 0.23 |
| OOO | 21.24 | 15.45 | 23.74 | 26.06 | 27.02 | 28.58 |
| EOL | 6.34 | 4.92 | 6.91 | 6.23 | 6.09 | 6.16 |
| OOL | 4.57 | 2.95 | 5.05 | 5.37 | 5.23 | 5.63 |
| ELL | 4.7 | | 5.17 | | 5.23 | |
| OLL | 1.57 | 0.35 | 2.14 | 0.8 | 2.34 | 0.35 |
| LLL | 1.06 | | 1.23 | | 0.92 | |
| EOA | 1.14 | 1.56 | | 0.14 | 0.42 | |
| OOA | 1.91 | 3.22 | 2.16 | 4.65 | 2.05 | 4.27 |
| OLA | 0.24 | 0.23 | 0.3 | 0.55 | 0.65 | 0.49 |
| EOB | 0.61 | 1.37 | | 0.19 | | |
| OOB | 2.98 | 3.76 | 3.22 | 3.44 | 2.51 | 2.69 |
| OLB | 0.54 | 0.3 | 0.53 | 0.49 | 0.65 | 0.38 |

P = palmitic acid = 16:0;
E = stearic acid = 18:0;
O = oleic acid = 18:1;
L = linoleic acid = 18:2;
A = araquidic acid = 20:0;
B = behenic acid = 22:0
Oils HOHS 24E and HOHS 253 were extracted from CAS-33 and CAS-15 seed.

2. Solvent Fractionation of High-Oleic High-Stearic Oils

Examples of solvent fractionation could be found in table 6. Two high-oleic and high stearic oils (HOHS 253 and HOHS 24E, extracted from seeds of lines CAS-15 (described in Fernandez-Moya et al. J. Agric. Food Chem. 53:5326-5330 (2005)) or from HOHS seeds as described in WO0074470, were fractionated with acetone at 0° C. and their respective olein fractions collected (Sup 1_253 and Sup 1_24E). Two other fractions were obtained at −5° C. (Sup 2_253 and Sup 2_24E).

Fractions obtained at 0 and −5° C. have reduced content of disaturated TAG such as POS, SOS, SOA, SOB etc. The TAG composition could be shown as TAG classes according to the saturated (S) monounsaturated (M) and diunsaturated (D) TAG content. Table 7 shows the data grouped as stated above.

TABLE 7

Triacylglyceride class composition of high stearic-high oleic oils and different fractions prepared by fractionation with acetone at 0° C. (sup. 1) and −5° C. (sup. 2).

| Triacylglyceride Classes | Triacylglyceride composition (mol %) | | | | | |
|---|---|---|---|---|---|---|
| | HOHS 253 | HOHS 24E | Sup. 1_253 | Sup. 1_24E | Sup 2_253 | Sup. 2_24E |
| SMS | 11.88 | 19.55 | 3.69 | 3.48 | 3.46 | 2.61 |
| SDS | 3.76 | 0.83 | 2.71 | 0.37 | 1.36 | 0.61 |
| SMM | 41.1 | 54.35 | 45.21 | 54.58 | 43.57 | 52.95 |
| SMD | 8.95 | 6.51 | 9.87 | 9.13 | 9.7 | 9.27 |
| SDD | 5.88 | — | 6.33 | 0.21 | 6.41 | — |
| MMM | 21.24 | 15.45 | 23.74 | 26.06 | 27.02 | 28.58 |
| MMD | 4.57 | 2.95 | 5.05 | 5.37 | 5.23 | 5.63 |
| MDD | 1.57 | 0.35 | 2.14 | 0.8 | 2.34 | 0.35 |
| DDD | 1.06 | — | 1.23 | — | 0.92 | — |
| SUS | 15.64 | 20.38 | 6.4 | 3.85 | 4.82 | 3.22 |
| SUU | 55.93 | 60.86 | 61.41 | 63.92 | 59.68 | 62.22 |
| UUU | 28.44 | 18.75 | 32.16 | 32.23 | 35.51 | 34.56 |

S = saturated fatty acid,
M = monoenoic fatty acid and
D = dienoic fatty acid,
U = unsaturated fatty acid.

From the above it follows that the olein fractions of the invention have a substantially lower SMS value than the starting oils.

3. Solvent Fractionation of High-Oleic High-Palmitic Oils

Other saturated oils from sunflower, such as the high-palmitic and high-oleic oil from CAS-12, were also fractionated and an olein fraction obtained. This olein fraction has reduced amounts of disaturated TAG.

The TAG composition of the original high-oleic and high-palmitic sunflower oil (HOHP from CAS-12) and the fractions obtained with acetone at 0 and −5° C. after 24 h, named Sup.1 and Sup.2 respectively, are shown in the table 8.

The TAG composition could be shown as TAG classes. Table 9 shows the TAG classes of the original HOHP oil and the Sup. 1 and Sup. 2 fractions.

The olein fractions have a reduced amount of disaturated TAG, such as SMS and a increased amount of monosaturated TAG and triunsaturated TAG such as SMM and MMM.

TABLE 8

Triacylglycerol composition of high oleic-high palmitic oil (CAS-12) and different fractions prepared by fractionation with acetone at 0° C. (supernatant 1) and −5° C. (supernatant 2).

| Triacylgliceride | Triacylglyceride composition (mol %) | | |
|---|---|---|---|
| | HOHP | Sup. 1 | Sup. 2 |
| PPoP | 0.62 | 0.71 | 0.35 |
| PPoPo | 0.28 | 0.44 | 0.64 |
| POP | 17.5 | 7.02 | 2.26 |
| PAsP | 0.66 | — | 0.29 |
| PPoO | 9.87 | 16.46 | 13.44 |
| PPoL | 1.3 | 2.49 | 2.64 |
| POE | 1.85 | 0.64 | 0.48 |
| POO | 30.9 | 36.31 | 29.73 |
| POAs | 5.41 | 7.07 | 7.01 |
| POL | 8.22 | 12.3 | 12.54 |
| PoOO | 1.41 | — | 2.68 |
| PoOL | 0.54 | 0.56 | 0.82 |
| EOE | 0.25 | — | — |
| EOO | 2.22 | 1.99 | 3.67 |
| OOO | 10.99 | 8.08 | 13.38 |
| OOAs | 3.74 | 3.35 | 5.57 |
| OOL | 1.43 | 0.92 | 1.49 |
| POB | 0.96 | 0.15 | 0.4 |
| OOA | 0.25 | 0.22 | 0.4 |
| OOB | 1.02 | 0.59 | 1.2 |

P = palmitic acid = 16:0;
Po = palmitoleic acid = 16:1;
E = stearic acid = 18:0;
O = oleic acid = 18:1$^{\Delta 9}$;
As = asclepic acid = 18:1$^{\Delta 11}$;
L = linoleic acid = 18:2;
A = araquidic acid = 20:0;
B = behenic acid = 22:0

TABLE 9

Triacylglyceride class composition of high oleic-high palmitic oil and different fractions prepared by fractionation with acetone at 0° C. (supernatant 1) and −5° C. (supernatant 2).

| Triacylgliceride Classes | Triacylglyceride composition (mol %) | | |
|---|---|---|---|
| | HOHP | Sup. 1 | Sup. 2 |
| SMS | 21.84 | 8.52 | 3.78 |
| SDS | — | — | — |
| SMM | 49.95 | 63.08 | 56.09 |
| SMD | 9.52 | 14.79 | 15.18 |
| SDD | — | — | — |
| MMM | 16.14 | 11.43 | 21.63 |
| MMD | 1.97 | 1.48 | 2.31 |
| MDD | — | — | — |
| DDD | — | — | — |
| SUS | 21.84 | 8.52 | 3.78 |
| SUU | 59.47 | 77.87 | 71.27 |
| UUU | 18.11 | 12.91 | 23.94 |

S = saturated fatty acid,
M = monoenoic fatty acid and
D = dienoic fatty acid,
U = unsaturated fatty acid.

4. Dry Fractionation of Oils

Oils were fractionated without solvents by cooling the oils for 24-48 h without any solvent. The resulting precipitates were sedimented by centrifugation at 5000×g for 30 min at the temperature of fractionation. Oleins were separated as the supernatants. The temperatures of fractionation ranged from 12 to 0° C. Dry fractionation is described in "Edible Fats and Oils Processing: Basic Principles and Modern Practices", 1990, World Conference Proceedings, American Oil Chemists' Society, pages. 136-141 and 239-245.

During low temperature storage saturated TAG crystals are formed and could be separated from liquid oil through centrifugation, cold press, etc. Some examples of dry fractionation are shown in the tables 10 and 11. Original high oleic and high-stearic oil was kept at 9.5° C., and the olein called sup 1 was recovered as the supernatant. Olein Sup 1 was then fractionated at 5° C. for 24 h, resulting in the olein called sup 2 as the supernatant. Sup 2 was subsequently fractionated again at 2.5° C. for 24 h and sup 3 in tables 10 and 11 were obtained.

As in the solvent fractionation, the disaturated TAG decrease while the more unsaturated TAG species increase. The same results shown as TAG classes could be found in the table 11.

TABLE 10

Triacylglycerol composition of high stearic-high oleic oil (oil obtained from HOHS seeds) and different fractions prepared by dry fractionation at 9.5° C. (supernatant 1), 5° C. (supernatant 2) and 2.5° C. (supernatant 3).

| Triacylglyceride | Triacylglyceride composition (mole %) | | | |
|---|---|---|---|---|
| | HOHS | Sup. 1 | Sup. 2 | Sup. 3 |
| POP | 0.56 | 0.46 | 0.51 | 0.45 |
| POE | 3.38 | 2.36 | 2.19 | 2.34 |
| POO | 7.18 | 7.9 | 8 | 8.21 |
| PLE | — | — | 0.19 | — |
| POL | 0.98 | 1.18 | 1.14 | 1.07 |
| EOE | 6.7 | 3.15 | 2.82 | 2.81 |
| EOO | 36.65 | 39.46 | 37.38 | 38.23 |
| ELE | 0.47 | — | 0.33 | 0.3 |
| OOO | 25.42 | 27.78 | 28.52 | 28.59 |
| EOL | 4.98 | 5.22 | 5.33 | 5.13 |
| OOL | 4.76 | 4.96 | 5.13 | 5.01 |
| OLL | 0.32 | — | 0.37 | 0.22 |
| EOA | 0.98 | 0.39 | 0.4 | 0.31 |
| OOA | 2.87 | 3.06 | 2.98 | 3.01 |
| OLA | 0.27 | — | 0.26 | 0.27 |
| EOB | 0.82 | — | 0.28 | 0.24 |
| OOB | 3.47 | 4.1 | 3.81 | 3.41 |
| OLB | 0.2 | — | 0.31 | 0.38 |

P = palmitic acid = 16:0;
E = stearic acid = 18:0;
O = oleic acid = 18:1;
L = linoleic acid = 18:2;
A = araquidic acid = 20:0;
B = behenic acid = 22:0

TABLE 11

Triacylglyceride class composition of high stearic-high oleic oil (oil obtained from HOHS seeds) and different fractions prepared by dry fractionation at 9.5° C. (supernatant 1), 5° C. (supernatant 2) and 2.5° C. (supernatant 3).

| TAG class | Triacylglyceride composition (mole %) | | | |
|---|---|---|---|---|
| | HOHS | Sup. 1 | Sup. 2 | Sup. 3 |
| SMS | 12.44 | 6.36 | 6.2 | 6.15 |
| SDS | 0.47 | 0 | 0.52 | 0.3 |
| SMM | 50.17 | 54.52 | 52.17 | 52.86 |
| SMD | 6.43 | 6.4 | 7.04 | 6.85 |
| SDD | — | — | — | — |
| MMM | 25.42 | 27.78 | 28.52 | 28.59 |
| MMD | 4.76 | 4.96 | 5.13 | 5.01 |
| MDD | 0.32 | 0 | 0.37 | 0.22 |
| DDD | — | — | — | — |
| SUS | 12.91 | 6.36 | 6.72 | 6.45 |
| SUU | 56.6 | 60.92 | 59.21 | 59.71 |
| UUU | 30.5 | 32.74 | 34.02 | 33.82 |

S = saturated fatty acid,
M = monoenoic fatty acid and
D = dienoic fatty acid.

Dry fractionation of a given oil is very dependent on the temperatures used for triacylglycerides crystallization. Therefore, the composition of the resulting olein fractions was different. The data stated in the tables 12 an 13 below are representative for the dry fractionation of a high oleic high stearic oil, sequentially at 12, 2.5 and 0° C. for 24 h.

Oil fractionation at lower temperatures produced more liquid olein with a lower content of TAGs of the form SMS and a higher content of classes more unsaturated like MMM or MMD. The occurrence of TAGs of the form SMM reached a maximum in the sup 1 and then slightly decreased in sup 2 and sup 3, increasing the more unsaturated species like MMM and MMD.

TABLE 12

Triacylglycerol composition of high stearic-high oleic oil and different fractions prepared by dry fractionation at 12° C. (sup 1), 2.5° C. (sup. 2) and 0° C. (sup. 3).

| Triacylglyceride | Triacylglyceride composition (mole %) | | | |
|---|---|---|---|---|
| | HOHS 310 | Sup. 1 | Sup. 2 | Sup. 3 |
| POP | 0.56 | 0.47 | 0.47 | 0.32 |
| POE | 3.78 | 2.58 | 2.42 | 1.61 |
| POO | 7.55 | 7.35 | 7.68 | 8.17 |
| POL | 0.92 | 1 | 1.04 | 0.99 |
| EOE | 7.45 | 3.88 | 3.18 | 1.74 |
| EOO | 38.49 | 41.63 | 40.75 | 37.3 |
| OOO | 24.77 | 26.02 | 27.38 | 32.1 |
| EOL | 4.44 | 5.19 | 5.11 | 4.93 |
| OOL | 4.14 | 4.62 | 4.86 | 6.09 |
| OLL | | | | 0.29 |
| EOA | 1 | 0.52 | 0.3 | |
| OOA | 2.58 | 2.75 | 2.83 | 3.06 |
| EOB | 1.34 | 0.9 | 0.76 | |
| OOB | 2.99 | 3.1 | 3.23 | 3.41 |

P = palmitic acid = 16:0;
E = stearic acid = 18:0;
O = oleic acid = 18:1;
L = linoleic acid = 18:2;
A = araquidic acid = 20:0;
B = behenic acid = 22:0

TABLE 13

Triacylglyceride class composition of high stearic-high oleic oil and different fractions prepared by dry fractionation at 12° C. (supernatant 1), 2.5° C. (supernatant 2) and 0° C. (supernatant 3).

| Triacylgliceride class | Triacylglyceride composition (mole %) | | | |
|---|---|---|---|---|
| | HOHS 310 | Sup. 1 | Sup. 2 | Sup. 3 |
| SMS | 14.13 | 8.35 | 7.13 | 3.67 |
| SDS | | | | |
| SMM | 51.61 | 54.83 | 54.49 | 51.94 |
| SMD | 5.36 | 6.19 | 6.15 | 5.92 |
| SDD | | | | |
| MMM | 24.77 | 26.02 | 27.38 | 32.1 |
| MMD | 4.14 | 4.62 | 4.86 | 6.09 |
| MDD | | | | 0.29 |
| DDD | | | | |
| SUS | 14.13 | 8.35 | 7.13 | 3.67 |
| SUU | 56.97 | 61.02 | 60.64 | 58.15 |
| UUU | 28.91 | 30.64 | 32.24 | 38.48 |

S = saturated fatty acid,
M = monoenoic fatty acid and
D = dienoic fatty acid,
U = unsaturated fatty acid.

Example 4

Determination of Cloud Point

For many food purposes a liquid oil is preferable, for example for deep frying most companies prefer liquid oils to avoid thermal isolation and heating to avoid solidification of fats. The cloud point is defined as the temperature in which the oil becomes turbid due to solidification of TAGs in a given conditions. It measures when an oil started to be solid and some crystals of solid fat appear because of the low temperature. Oils with lower cloud points are liquid at lower temperatures. Also when food products need to be stored in the refrigerator, a liquid oil with a cloud point near or below to 0° C. is preferable.

To measure the cloud point of olein fractions with different SUS contents and control oils, amounts of 10 g of each were transferred to glass screwed-capped tubes and were heated to 80° C. to remove any trace of solids. Then they were moved to a thermostatized bath endowed with a lamp and a window allowing to examine the turbidity of the oils. The initial temperature of the bath was 30° C., then temperature was decreased at the rate of 2° C. each 20 min. to reach a final temperature of −10° C. The cloud points were visually established as the temperature in which a given oil became turbid.

The cloud points of some olein fractions from high oleic high stearic oils have been determined. The triacylglyceride composition of these olein fractions is in Table 14.

TABLE 14

Triacylglyceride class composition of olein fractions used to determine the cloud point.

| Olein | SMS | SDS | SMM | SMD | SDD | MMM | MMD | MDD | DDD |
|---|---|---|---|---|---|---|---|---|---|
| A | 3.1 | | 54.2 | 3.5 | | 34.4 | 4.4 | 0.4 | |
| B | 0.7 | | 43.0 | 5.1 | | 44.8 | 6.1 | | |
| C | 3.7 | | 51.9 | 5.9 | | 32.1 | 6.1 | 0.3 | |
| D | 7.1 | | 54.5 | 6.2 | | 27.4 | 4.9 | | |

S = saturated fatty acid,
M = monoenoic fatty acid and
D = dienoic fatty acid,

Table 15 shows that the cloud point of standard and high-oleic oils the same, being of −8° C. Therefore, they started to become solid at temperatures below 0° C., but the high saturated oils have cloud point above 20° C., they are solid in the refrigerator. The olein fractions prepared by solvent or dry fractionation of a high oleic-high stearic oil have cloud points near 0° C. and below and close to standard and high-oleic oils. Their behaviour in refrigerator temperatures is similar to standard and high-oleic oils.

TABLE 15

Cloud points of different oils and HOHE olein fractions.

| Sunflower oil | SUS content (%) | Cloud point (° C.) |
|---|---|---|
| Standard (CAS-6) | 2 | −8 |
| High-oleic (CAS-9) | 1 | −8 |
| High-oleic and high-stearic (CAS-15) | 19 | 24 |
| Olein A | 3 | −4 |
| Olein B | 1 | −6 |
| Olein C | 4 | −1 |
| Olein D | 7 | 4 |

Example 5

Thermostability

1. Purification of TAGs

TAGs from different oils and olein fractions (Sup. 1_253 and Sup. 2_253 from example 3; Table 6) were purified and devoid of tocopherols before carrying out the studies of thermostability by using the protocol described in example 3.

Upon heating the quality of an oil can deteriorate because the TAG's constituting the oil are oxidized and/or polymerized. To test the thermostability a heat treatment at 180° C. during 10 h was performed as follows.

2. Thermoxidative Treatment

Thermoxidative treatment of the samples was carried out under strictly controlled conditions according to Barrera-Arellano et al. (Grasas Aceites 48, 231-235 (1997). Briefly, 2.00±0.01 g of purified TAG were weighed out in standard glass tubes of 13 cm.times.1 cm I.D., and in turn introduced into an oven at 180.0±0.1° C. Samples of 50 mg were withdrawn at 2 h intervals for the analysis of polymerized TAG. After heating for a total period of 10 h, final samples were taken out and additionally analyzed for polar compounds and distribution in oxidized TAG monomers and TAG polymers. Rancimat™ instructions were carefully observed for cleaning of vessels and temperature correction. No bubbling of air was applied during heating and the vessels were left open.

3. Quantification of TAGs

Polymerized TAG in the various oils were quantified by high-performance size exclusion chromatography (HPSEC) following a modification of the IUPAC Standard Method 2508 (supra) by means of using a light scattering detector instead of a refraction index detector in the HPLC. Total polar compounds and their distribution in oxidized TAG monomers and TAG polymers were determined by a combination of adsorption chromatography and HPSEC (Dobarganes et al. Fat Sci. Technol. 90, 308-311 (1988)).

Conditions applied for HPSEC were as follows: Separations were carried out in a Waters 2695 Module (Milford, Mass.) endowed with a Waters 2420 ELS detector Data was processed using Empower software. Ultrastyragel columns (Waters Associates, Milford, Mass., USA) connected in series and operated at 35° C. (25 cm.times.0.77 cm I.D.), were packed with a porous, highly cross-linked styrene divinyl bencene copolymer (<10 Am). HPLC-grade tetrahydrofuran served as the mobile phase with a flow of 1 mL/min. Sample solutions of 50 mg oil/mL and 15 mg polar compounds/ml in tetrahydrofuran were used for the analysis of polymerized TAG and polar compounds distribution, respectively.

4. Monitoring TAG Alterations

Monitoring the formation of dimers, polymers and altered TAGs in conditions similar to those used in industrial and domestic frying gives information about the oxidative stability of the given oils and fractions. Therefore, purified TAGs from common sunflower oil, which was rich in linoleic acid CAS-6 (Salas et al. JAOCS 83:539-545 (2006)) (Table 5) displayed the highest rate of polymerization (FIG. 1), reaching 28% of polymerized TAGs after 10 h at 180° C.

In the high oleic oil CAS-9 (Fernandez-Moya et al. J. Agric. Food Chem. 53:5326-5330 (2005)) TAGs were more stable than common sunflower oil but they polymerized more quickly than those from both supernatants obtained by fractionation of HOHS oils (Sup. 1_253 and Sup. 2_253 from example 3; Table 6) at 0° C. and −5° C.

Thus, these olein fractions, containing high levels of TAGs of the form SUU and low of SUS displayed higher stabilities than common and high oleic sunflower oils as well as low cloud points, which makes them stable liquid oils suitable for frying, baking, roasting, cooking and production of high stability mayonnaise, light mayonnaise, reduced fat mayonnaise, mustard, ketchup, tartar sauce, sandwich spread, salad bar bottle, salad dressing, pre-cooked food, prepared soup, sauces and cream.

High stearic-high oleic oils HOHS 17% and HOHS 20% (Table 5) and high palmitic high oleic oil (CAS-12) displayed similar rates of polymerization, slightly lower than the supernatant of 0° C. due to their high content of saturated fatty acids, which make them semisolid at room temperature.

Furthermore, data corresponding to altered TAGs after 10 h at 180° C. was in good agreement with the polymerization course (table 16). Common and high oleic oils displayed the highest content of altered TAGs, followed by the olein fractions isolated from HOHS oils supernatant 1 and supernatant 2, teaching again than these were stable liquid oils. The lowest content of altered TAGs was found in high saturated semisolid HOHS and HOHP oils. These latter oils are however not liquid and could become solid during low temperature transportation or storage.

TABLE 16

Altered triacylglyceride composition of different oils and olein fractions after 10 h at 180° C.

| | Altered TAGs (% w/w) | | | |
|---|---|---|---|---|
| | Monomers | Dimers | Oligomers | Total |
| Standard (CAS-6) | 8.8 | 10.2 | 17.4 | 36.3 |
| High-oleic (CAS-9) | 12.4 | 9.6 | 6.1 | 28.1 |
| High-oleic and high-palmitic (CAS-12) | 8.3 | 5.9 | 2.9 | 17.1 |
| HOHS17% E | 7.8 | 6.0 | 3.4 | 17.3 |
| HOHS20% E | 8.2 | 5.5 | 2.8 | 16.5 |
| Supernatant 0° C. | 9.4 | 7.1 | 4.7 | 21.3 |
| Supernatant −5° C. | 10.8 | 8.5 | 6.4 | 25.7 |

The invention claimed is:

1. A stable and liquid olein fraction made by fractionation of high oleic, high saturated sunflower oil, wherein;
   a. less than 8.6% of the TAG species of said olein fraction have the general formula SMS;
   b. at least 26% of TAG species of said olein fraction have the general formula SMM; and
   c. the olein fraction has a cloud point lower than −4° C.;
   wherein S represents a saturated fatty acid and M represents a monoenoic fatty acid, and wherein said olein fraction is obtainable by:
   fractionation of a high oleic high saturated sunflower oil; and
   collecting the liquid fraction.

2. A stable and liquid olein fraction as claimed in claim 1, wherein the fractionation is a low temperature dry fractionation, comprising the following steps:
   decreasing the temperature of the oil to or below 12° C.; and
   separating the olein from the solid fraction.

3. A stable and liquid olein fraction as claimed in claim 2, wherein the low temperature fractionation further contains the step of fractionating the resulting olein again at or below 2.5° C.

4. A stable and liquid olein fraction as claimed in claim 1, wherein the fractionation is a low temperature dry fractionation, consisting of the following steps:
   decreasing the temperature of the oil to or below 12° C.; and
   separating the olein from the solid fraction.

5. A stable and liquid olein fraction as claimed in claim 4 wherein the low temperature fractionation further contains the step of fractionating the resulting olein again at or below 2.5° C. to obtain a less saturated olein fraction.

6. A stable and liquid olein fraction as claimed in claim 1, wherein the fractionation is a low temperature solvent fractionation, comprising the following steps:
   mixing the oil with an organic solvent;
   decreasing the temperature of the oil solution to or below 0° C.; and
   separating the olein from the solid fraction.

7. A stable and liquid olein fraction as claimed in claim 6, wherein the fractionation further comprises the step of recovering the olein by removing the solvent from the supernatant.

8. A stable and liquid olein fraction as claimed in claim 6, wherein the organic solvent comprises a solvent selected from the group consisting of acetone, hexane and ethyl ether.

9. A stable and liquid olein fraction as claimed in claim 1, wherein the fractionation is a low temperature solvent fractionation, consisting of the following steps:
   mixing the oil with an organic solvent;
   decreasing the temperature of the oil solution to or below 0° C.; and
   separating the olein from the solid fraction.

10. A stable and liquid olein fraction as claimed in claim 9, wherein the fractionation further contains the step of recovering the olein by removing the solvent from the supernatant.

11. A stable and liquid olein fraction as claimed in claim 10, wherein the solvent is removed from the supernatant by distillation at vacuum.

12. A stable and liquid olein fraction as claimed in claim 9, wherein the organic solvent comprises a solvent selected from the group consisting of acetone, hexane and ethyl ether.

13. A stable and liquid olein fraction as claimed in claim 1, wherein the high oleic high saturated sunflower oil is a high oleic high stearic sunflower oil obtainable by extracting high oleic high stearic sunflower seeds which are obtainable by crossing CAS-3 (ATCC 75968) and a high thioesterase mutant with the deposit number ATCC PTA-628.

14. A stable and liquid olein fraction as claimed in claim 1, wherein the high oleic high saturated sunflower oil is a high palmitic sunflower oil obtainable by extracting seeds of the sunflower strain IG-1297M, which seeds were deposited on 20 Jan. 1998 under the ATCC accession number ATCC-209591.

15. A stable and liquid olein fraction as claimed in claim 1, wherein the high oleic high saturated sunflower oil is an high oleic high palmitic sunflower oil with low palmitoleic and low asclepic obtainable by extracting seeds of the sunflower strain CAS-25, which seeds are obtainable by crossing IG-1297M (ATCC 209591) and CAS-3 (ATCC 75968).

16. A stable and liquid olein fraction as claimed in claim 1, wherein the total linolenic acid content in said olein fraction is lower than 0.5%.

17. A stable and liquid olein fraction as claimed in claim 1, characterized in that the linoleic acid content in said olein fraction is lower than 15%.

18. A stable and liquid olein fraction as claimed in claim 1, wherein less than 6% of the TAG species of said olein fraction have the general formula SMS.

19. A stable and liquid olein fraction as claimed claim 1, wherein at least 30% of the TAG species of said olein have the general formula SMM.

20. A stable and liquid olein fraction as claimed in claim 19, wherein at least 35% of the TAG species of said olein have the general formula SMM.

21. A stable and liquid olein fraction as claimed in claim 19, wherein at least 45% of the TAG species of said olein have the general formula SMM.

22. A stable and liquid olein fraction as claimed in claim 1, wherein the fraction has less than 8% of saturated fatty acids at position sn-2 of the TAGs that constitute said olein fraction.

23. A stable and liquid olein fraction as claimed in claim 22, wherein the fraction has less than 5% of saturated fatty acids at position sn-2 of the TAGs that constitute said olein fraction.

24. A stable and liquid olein fraction as claimed in claim 22, wherein the fraction has less than 3% of saturated fatty acids at position sn-2 of the TAGs that constitute said olein fraction.

25. A sauce selected from mayonnaise, light mayonnaise, reduced fat mayonnaise, mustard, ketchup and tartar sauce, salad dressings, salad bar bottle, sandwich spreads, precooked food, prepared soup or cream, and ice-cream or ice-cream cake, comprising a stable and liquid olein fraction as claimed in claim 1.

26. A method of frying, baking, cooking or roasting, comprising heating a stable and liquid olein fraction of claim 1 at high temperature conditions of at least 100° C.

27. A method as claimed in claim 26, wherein the high temperature conditions comprise temperatures of at least 160° C.

28. A method as claimed in claim 27, wherein the high temperature conditions comprise temperatures of at least 180° C.

29. An oil mixture comprising a stable and liquid olein fraction as claimed in claim 1.

30. A stable and liquid olein fraction as claimed in claim 1, wherein the fraction has a cloud point lower than 6° C.

31. A method for preparation of a stable and liquid olein fraction comprising fractionating a high oleic, high saturated sunflower oil, wherein the fractionating includes the steps of:
   decreasing the temperature of the oil to or below 12° C.
   separating the olein from the solid fraction, and
   fractionating the resulting olein again at or below 2.5° to obtain a less saturated olein fraction;
   and wherein the olein fraction has a cloud point lower than 5° C.

32. A method as claimed in claim 31, wherein the fractionation is a low temperature solvent fractionation, which includes the following steps:
   mixing the oil with an organic solvent;
   decreasing the temperature of the oil solution to or below 0° C.; and
   separating the olein from the solid fraction.

33. A method for preparation of a stable and liquid olein fraction as claimed in claim 32, further comprising recovering the olein by removing the solvent from the supernatant by distillation at vacuum.

34. A method for preparation of a stable and liquid olein fraction as claimed in claim 32, wherein the organic solvent comprises a compound selected from the group consisting of acetone, hexane and ethyl ether.

* * * * *

UNITED STATES PATENT AND TRADEMARK OFFICE
CERTIFICATE OF CORRECTION

PATENT NO. : 8,460,736 B2  
APPLICATION NO. : 12/373023  
DATED : June 11, 2013  
INVENTOR(S) : J. J. Salas Liñan et al.

Page 1 of 1

It is certified that error appears in the above-identified patent and that said Letters Patent is hereby corrected as shown below:

In the Claims

| COLUMN | LINE | ERROR |
|---|---|---|
| 19 (Claim 19, | 4 line 1) | after "claimed" insert --in-- |
| 20 (Claim 30, | 7 line 2) | "6°C." should read -- -6°C.-- |
| 20 (Claim 31, | 11 line 4) | "12°C." should read --12°C.,-- |
| 20 (Claim 31, | 13 line 6) | "2.5°" should read --2.5°C.-- |

Signed and Sealed this  
Tenth Day of December, 2013

Margaret A. Focarino  
*Commissioner for Patents of the United States Patent and Trademark Office*